(12) United States Patent
Singh et al.

(10) Patent No.: US 12,242,413 B2
(45) Date of Patent: Mar. 4, 2025

(54) METHODS, SYSTEMS AND COMPUTER READABLE MEDIA FOR IMPROVING REMOTE DIRECT MEMORY ACCESS PERFORMANCE

(71) Applicant: Keysight Technologies, Inc., Santa Rosa, CA (US)

(72) Inventors: Nitesh Kumar Singh, Mukundapur (IN); Rakhahari Bhunia, Kolkata (IN); Abhijit Singha, Kolkata (IN); Sujoy Nandy, Howrah (IN)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 62 days.

(21) Appl. No.: 17/460,146

(22) Filed: Aug. 27, 2021

(65) Prior Publication Data

US 2023/0066835 A1 Mar. 2, 2023

(51) Int. Cl.
*G06F 15/173* (2006.01)
*G06F 13/16* (2006.01)
*G06F 15/167* (2006.01)

(52) U.S. Cl.
CPC .... *G06F 15/17331* (2013.01); *G06F 13/1621* (2013.01); *G06F 13/1642* (2013.01); *G06F 15/167* (2013.01)

(58) Field of Classification Search
CPC ........... G06F 15/17331; G06F 13/1621; G06F 13/1642; G06F 15/167
See application file for complete search history.

(56) References Cited

U.S. PATENT DOCUMENTS

| | | | | |
|---|---|---|---|---|
| 7,448,049 | B1* | 11/2008 | Xing | G06F 9/54 709/200 |
| 8,526,938 | B1* | 9/2013 | Gardner | H04W 24/06 455/433 |
| 9,037,640 | B2 | 5/2015 | Boddukuri et al. | |
| 9,842,083 | B2 | 12/2017 | Tsirkin | |
| 10,534,719 | B2* | 1/2020 | Beard | G06F 12/0653 |
| 10,983,704 | B1* | 4/2021 | Van Gaasbeck | G06F 3/0673 |
| 11,258,719 | B1* | 2/2022 | Sommers | H04L 47/2466 |
| 2002/0141424 | A1* | 10/2002 | Gasbarro | H04L 49/901 370/412 |

(Continued)

OTHER PUBLICATIONS

Notice of Allowance and Fee(s) Due for U.S. Appl. No. 17/001,614 (Sep. 29, 2021).

(Continued)

*Primary Examiner* — Atta Khan
*Assistant Examiner* — Wuji Chen

(57) ABSTRACT

The subject matter described herein includes methods, systems, and computer readable media for improving remote direct memory access (RDMA) performance. A method for improving RDMA performance occurs at an RDMA node utilizing a user space and a kernel space for executing software. The method includes posting, by an application executing in the user space, an RDMA work request including a data element indicating a plurality of RDMA requests associated with the RDMA work request to be generated by software executing in the kernel space; and generating and sending, by the software executing in the kernel space, the plurality of RDMA requests to or via a system under test (SUT).

12 Claims, 6 Drawing Sheets

(56) References Cited

U.S. PATENT DOCUMENTS

| | | | |
|---|---|---|---|
| 2005/0223274 A1* | 10/2005 | Bernick | G06F 11/1691 714/11 |
| 2005/0246578 A1* | 11/2005 | Bruckert | G06F 11/1687 714/11 |
| 2005/0246587 A1* | 11/2005 | Bernick | G06F 11/3476 714/38.13 |
| 2006/0020852 A1* | 1/2006 | Bernick | G06F 13/26 714/11 |
| 2006/0031600 A1* | 2/2006 | Ellis | G06F 13/28 710/22 |
| 2006/0047867 A1* | 3/2006 | Craddock | G06F 5/065 710/54 |
| 2006/0075067 A1* | 4/2006 | Blackmore | H04L 69/16 709/217 |
| 2007/0083680 A1* | 4/2007 | King | G06F 13/28 710/22 |
| 2007/0282967 A1* | 12/2007 | Fineberg | G06F 11/1641 710/22 |
| 2008/0005385 A1* | 1/2008 | Lubbers | G06F 11/2087 710/52 |
| 2008/0013448 A1* | 1/2008 | Horie | H04L 69/32 370/229 |
| 2008/0126509 A1* | 5/2008 | Subramanian | H04L 47/10 709/214 |
| 2008/0147822 A1* | 6/2008 | Benhase | H04L 49/90 711/147 |
| 2009/0106771 A1* | 4/2009 | Benner | G06F 12/1466 719/313 |
| 2010/0281201 A1* | 11/2010 | O'Brien | G06F 13/4027 710/308 |
| 2011/0106905 A1* | 5/2011 | Frey | H04L 69/166 709/212 |
| 2011/0145211 A1* | 6/2011 | Gerber | H04L 41/5058 709/224 |
| 2011/0242993 A1* | 10/2011 | Gotou | H04L 43/50 370/250 |
| 2012/0066179 A1* | 3/2012 | Saika | G06F 3/067 707/634 |
| 2012/0331243 A1* | 12/2012 | Aho | G06F 15/167 711/E12.001 |
| 2013/0066923 A1* | 3/2013 | Sivasubramanian | G06F 11/3006 707/802 |
| 2014/0181232 A1* | 6/2014 | Manula | H04L 69/329 709/213 |
| 2015/0280972 A1* | 10/2015 | Sivan | H04L 41/0668 370/225 |
| 2016/0026605 A1* | 1/2016 | Pandit | G06F 15/17331 709/212 |
| 2016/0119422 A1* | 4/2016 | Aslam | G06F 15/167 709/212 |
| 2016/0248628 A1* | 8/2016 | Pandit | H04L 41/0806 |
| 2017/0103039 A1* | 4/2017 | Shamis | H04L 67/1097 |
| 2017/0149890 A1* | 5/2017 | Shamis | H04L 67/1097 |
| 2017/0168986 A1* | 6/2017 | Sajeepa | G06F 15/17331 |
| 2018/0102978 A1* | 4/2018 | Shen | H04L 69/14 |
| 2018/0314657 A1* | 11/2018 | Chen | G06F 9/4411 |
| 2019/0121889 A1* | 4/2019 | Gold | G06F 16/2255 |
| 2019/0219999 A1* | 7/2019 | Lam | G05D 1/0022 |
| 2019/0354406 A1 | 11/2019 | Ganguli et al. | |
| 2019/0386924 A1* | 12/2019 | Srinivasan | H04L 47/2441 |
| 2020/0067792 A1* | 2/2020 | Aktas | H04L 41/5009 |
| 2020/0097323 A1* | 3/2020 | Nider | G06F 3/067 |
| 2020/0120029 A1 | 4/2020 | Sankaran et al. | |
| 2020/0145480 A1* | 5/2020 | Sohail | H04L 67/1095 |
| 2020/0241927 A1* | 7/2020 | Yang | H04L 69/16 |
| 2020/0296303 A1* | 9/2020 | Yamashita | H04N 5/32 |
| 2020/0319812 A1* | 10/2020 | He | G06F 3/0604 |
| 2020/0326971 A1 | 10/2020 | Yang | |
| 2020/0358701 A1* | 11/2020 | Su | G06F 13/28 |
| 2020/0366608 A1 | 11/2020 | Pan et al. | |
| 2020/0396288 A1* | 12/2020 | Zhang | G06F 3/0638 |
| 2021/0004165 A1* | 1/2021 | Benisty | G06F 3/0661 |
| 2021/0112002 A1 | 4/2021 | Pan et al. | |
| 2022/0060422 A1* | 2/2022 | Sommers | H04L 47/2466 |
| 2022/0103484 A1* | 3/2022 | Penaranda Cebrian | H04L 47/27 |
| 2022/0103536 A1* | 3/2022 | Kida | H04L 63/0435 |
| 2022/0164510 A1* | 5/2022 | Reid | G06F 30/34 |
| 2022/0165423 A1* | 5/2022 | Luber | G16H 10/60 |
| 2022/0179809 A1* | 6/2022 | Venkataramani | G06F 3/0655 |
| 2022/0197552 A1* | 6/2022 | Corbetta | G06F 3/0683 |
| 2022/0229768 A1* | 7/2022 | Martin | G06F 11/3692 |
| 2023/0061873 A1* | 3/2023 | Margolin | G06F 12/1081 |
| 2023/0066835 A1* | 3/2023 | Singh | G06F 15/17331 |
| 2023/0305747 A1* | 9/2023 | Subramanian | G06F 3/0604 |
| 2023/0401005 A1* | 12/2023 | Muthiah | G06F 3/0688 |

OTHER PUBLICATIONS

Non-Final Office Action for U.S. Appl. No. 17/001,614 (Apr. 23, 2021).

Commonly-assigned, co-pending U.S. Appl. No. 17/001,614 for "Methods, Systems and Computer Readable Media for Network Congestion Control Tuning," (Unpublished, filed Aug. 24, 2020).

Beltman et al., "Collecting telemetry data using P4 and RDMA," University of Amsterdam, pp. 1-12 (2020).

Liu et al., "HPCC++: Enhanced High Precision Congestion Control," Network Working Group, pp. 1-15 (Jun. 17, 2020).

"Traffic Management User Guide (QFX Series and EX4600 Switches)," Juniper Networks, pp. 1-1121 (Mar. 18, 2020).

"H3C S6850 Series Data Center Switches," New H3C Technologies Co., Limited, pp. 1-13 (Mar. 2020).

Even et al., "Data Center Fast Congestion Management," pp. 1-15 (Oct. 23, 2019).

Li et al., "HPCC: High Precision Congestion Control," SIGCOMM '19, pp. 1-15 (Aug. 19-23, 2019).

"RoCE Congestion Control Interoperability Perception vs. Reality," Broadcom White Paper, pp. 1-8 (Jul. 23, 2019).

"What is RDMA?," Mellanox, pp. 1-3 (Apr. 7, 2019).

Mandal, "In-band Network Telemetry—More Insight into the Network," Ixia, https://www.ixiacom.com/company/blog/band-network-telemetry-more-insight-network, pp. 1-9 (Mar. 1, 2019).

Geng et al., "P4QCN: Congestion Control Using P4-Capable Device in Data Center Networks," Electronics, vol. 8, No. 280, pp. 1-17 (Mar. 2, 2019).

"Understanding DC-QCN Algorithm for RoCE Congestion Control," Mellanox, pp. 1-4 (Dec. 5, 2018).

"Data Center Quantized Congestion Notification (DCQCN)," Juniper Networks, pp. 1-7 (Oct. 4, 2018).

"Understanding RoCEv2 Congestion Management," Mellanox, https://community.mellanox.com/s/article/understanding-rocev2-congestion-management, pp. 1-6 (Dec. 3, 2018).

Mittal et al., "Revisiting Network Support for RDMA," SIGCOMM '18, pp. 1-14 (Aug. 20-25, 2018).

Varadhan et al., "Validating ROCEV2 in the Cloud Datacenter," OpenFabrics Alliance, 13th Annual Workshop 2017, pp. 1-17 (Mar. 31, 2017).

Zhu et al., "ECN or Delay: Lessons Learnt from Analysis of DCQCN and TIMELY," CoNEXT '16, pp. 1-15 (Dec. 12-15, 2016).

Kim et al., "In-band Network Telemetry (INT)," pp. 1-28 (Jun. 2016).

Zhu et al., "Congestion Control for Large-Scale RDMA Deployments," SIGCOMM '15, pp. 1-14 (Aug. 17-21, 2015).

Zhu et al., "Packet-Level Telemetry in Large Datacenter Networks," SIGCOMM '15, pp. 1-13 (Aug. 17-21, 2015).

Mittal et al., "TIMELY: RTT-based Congestion Control for the Datacenter," SIGCOMM '15, pp. 1-14 (Aug. 17-21, 2015).

"RoCE in the Data Center," Mellanox Technologies, White Paper, pp. 1-3 (Oct. 2014).

Barak, "Introduction to Remote Direct Memory Access (RDMA)," http://www.rdmamojo.com/2014/03/31/remote-direct-memory-access-rdma/, pp. 1-14 (Mar. 31, 2014).

"Quick Concepts Part 1—Introduction to RDMA," ZCopy, Education and Sample Code for RDMA Programming, pp. 1-5 (Oct. 8, 2010).

(56) References Cited

OTHER PUBLICATIONS

Alizadeh et al., "Data Center TCP (DCTCP)," SIGCOMM '10, pp. 1-12 (Aug. 30-Sep. 3, 2010).
Grochla, "Simulation comparison of active queue management algorithms in TCP/IP networks," Telecommunication Systems, pp. 1-9 (Oct. 2008).
Chen et al., "Data Center Congestion Management requirements," https://tools.ietf.org/id/draft-yueven-tsvwg-dccm-requirements-01.html, pp. 1-7 (Jul. 2019).
Kalia et al., "Using RDMA Efficiently for Key-Value Services," SIGCOMM'14, pp. 1-12 (Aug. 17-22, 2014).

\* cited by examiner

| PAYLOAD SIZE | QUEUE PAIR (QP) COUNT | TECHNIQUE 1 THROUGHPUT | TECHNIQUE 2 THROUGHPUT | IMPROVEMENT (FROM TECHNIQUE 1 TO 2) |
|---|---|---|---|---|
| 64 B | 192 | 1 Gbps | 1.6 Gbps | 60% |
| 128 B | 192 | 1.58 Gbps | 2.4 Gbps | 51.9% |
| 256 B | 192 | 2.58 Gbps | 3.2 Gbps | 24% |
| 512 B | 192 | 4.5 Gbps | 5.7 Gbps | 26.7% |
| 1024 B | 192 | 7.5 Gbps | 10 Gbps | 33.3% |
| 2048 B | 192 | 11 Gbps | 15 Gbps | 36.4% |
| 4096 B | 192 | 21 Gbps | 24.5 Gbps | 16.7% |

FIG. 5

METHODS, SYSTEMS AND COMPUTER READABLE MEDIA FOR IMPROVING REMOTE DIRECT MEMORY ACCESS PERFORMANCE

TECHNICAL FIELD

The subject matter described herein relates to network device testing. More particularly, the subject matter described herein relates to methods, systems, and computer readable media for improving remote direct memory access (RDMA) performance.

BACKGROUND

Network operators typically test network nodes for reliability and other characteristics before deploying the network nodes to production environments (e.g., non-test environments). Generally, it is important to test networks nodes with various amounts of traffic and different types of traffic. For example, a test platform, such as an IxNetwork™ platform manufactured by Keysight, may be usable for network topology testing and traffic analysis and may generate test traffic for testing various network nodes using one or more protocols.

Data centers may be a term for distributed systems (e.g., multiple servers, switches, and/or other devices in same building) used for performing various functions. Within a data center, some nodes may perform centralized functions (e.g., services or microservices, like authentication or data access) involved with handling user traffic or providing services to users. Generally, east-west traffic may refer to intra-data center traffic (e.g., traffic within the data center or nodes thereof) and north-south traffic may refer to traffic that traverses the data center from or to a system physically residing outside the data center, e.g., traffic to or from a user.

Issues can arise when testing and/or configuring a data center or a distributed system. For example, a network operator may wish to stress test the data center or nodes therein. However, with conventional test systems, it can require significant time and testing resources to generate enough traffic at rates high enough for effective stress testing.

SUMMARY

The subject matter described herein includes methods, systems, and computer readable media for improving remote direct memory access (RDMA) performance. A method for improving RDMA performance occurs at an RDMA node utilizing a user space and a kernel space for executing software. The method includes posting, by an application executing in the user space, an RDMA work request including a data element indicating a plurality of RDMA requests associated with the RDMA work request to be generated by software executing in the kernel space; and generating and sending, by the software executing in the kernel space, the plurality of RDMA requests to or via a system under test (SUT).

A system for improving RDMA performance includes an RDMA node implemented using at least one processor, the RDMA node utilizing a user space and a kernel space for executing software. The RDMA node is configured for: posting, by an application executing in the user space, an RDMA work request including a data element indicating a plurality of RDMA requests associated with the RDMA work request to be generated by software executing in the kernel space; and generating and sending, by the software executing in the kernel space, the plurality of RDMA requests to or via a SUT.

The subject matter described herein may be implemented in software in combination with hardware and/or firmware. For example, the subject matter described herein may be implemented in software executed by a processor. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, and application-specific integrated circuits. In addition, a computer readable medium that implements the subject matter described herein may be located on a single device or computing platform or may be distributed across multiple devices or computing platforms.

As used herein, the term "node" refers to at least one physical computing platform including one or more processors and memory.

As used herein, each of the terms "function", "engine", and "module" refers to hardware, firmware, or software in combination with hardware and/or firmware for implementing features described herein.

BRIEF DESCRIPTION OF THE DRAWINGS

Embodiments of the subject matter described herein will now be explained with reference to the accompanying drawings, wherein like reference numerals represent like parts, of which:

FIG. 5 illustrates example data indicating RDMA performance improvements associated with utilizing work queue entry loop count parameters.

DETAILED DESCRIPTION

Figure 1:
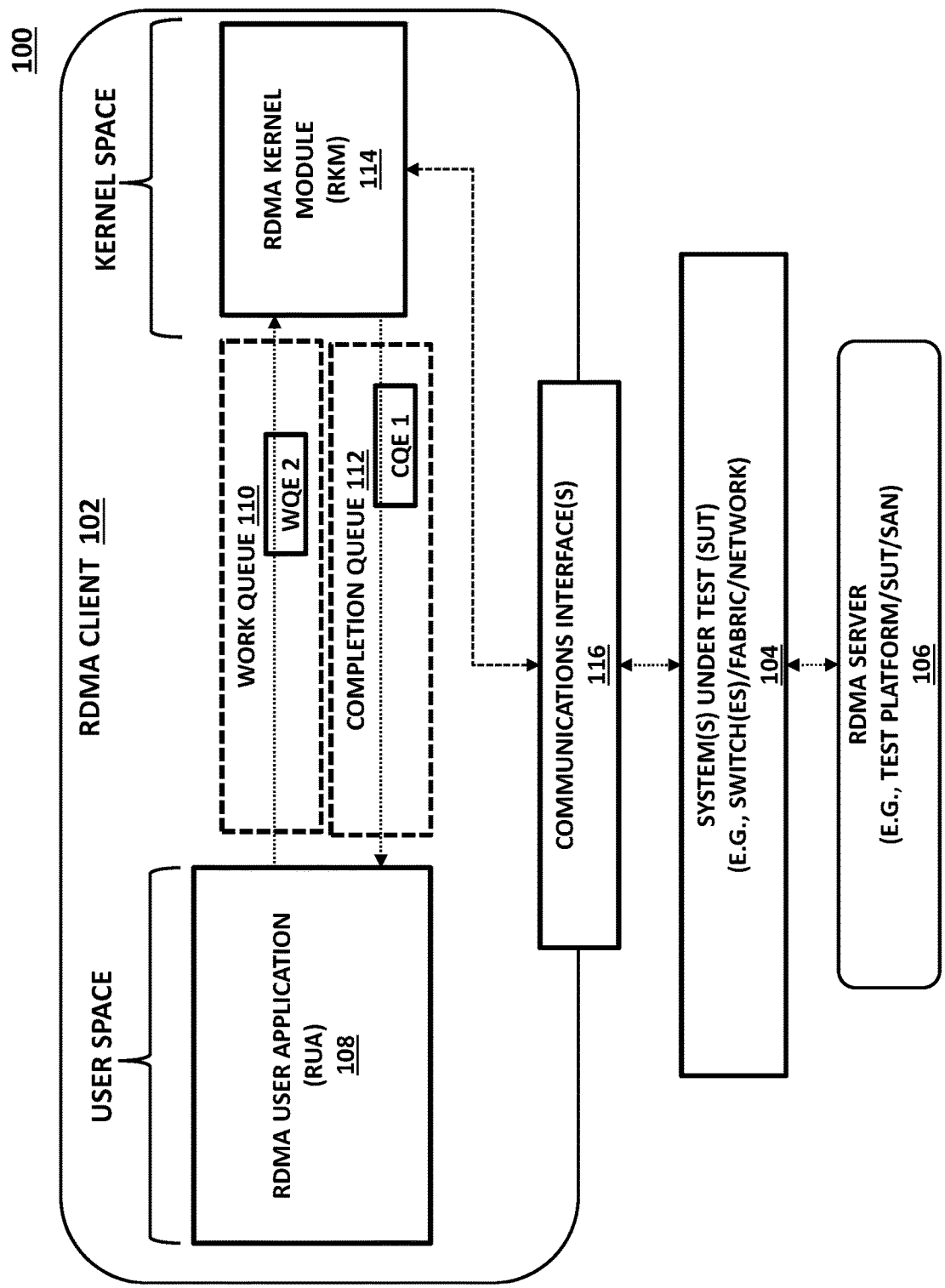
FIG. 1 is a block diagram illustrating an example environment for remote direct memory access (RDMA) related testing.

Remote direct memory access (RDMA) is concept usable by a remote machine to access memory of another machine without involving the machines' operating systems. By avoiding the operating systems, RDMA transactions can be significantly more efficient than alternate methods for requesting and receiving such data. One example RDMA implementation may utilize an RDMA over converged Ethernet (RoCE) protocol (e.g., RoCE v2 protocol) which allows RDMA transactions across an Ethernet network as long as the endpoints are RDMA capable. For example, using an RoCE protocol, an RDMA capable NIC (RNIC) or related device may send RDMA traffic to another RNIC or related device via standard Ethernet infrastructure. Further, the RoCE protocol can be deployed within a data center environment for improving performance of applications and microservices hosted within the data center environment.

RoCE can be utilized in data centers for facilitating high performance, e.g., low latency with minimal CPU overhead, when reading or writing data. For example, various RDMA nodes may send RDMA requests and responses between a data center's fabric. When testing such a fabric or related entities, a test platform may be configured to stress test a system under test (SUT) (e.g., one or more switches) by flooding the SUT with RDMA related traffic (e.g., data packets) or various adverse conditions. In order to simulate such an environment, a suitable test platform may need to generate and send high amounts of traffic quickly, e.g., thereby utilizing a fabric maximum possible bandwidth. One possible way to increase RDMA traffic generation can involve efficiently utilizing a processor or related hardware. However, inefficiencies exist in conventional RDMA implementations where context-switching between user space and kernel space can limit traffic generation or throughput performance.

In accordance with some aspects of the subject matter described herein, techniques, systems, methods, or mechanisms for improving RDMA performance are provided. In some embodiments, improving RDMA performance may involve extending or modifying RDMA related functions (e.g., InfiniBand (IB) verbs) or related application programming interface (API) commands or messages to minimize or reduce context-switching and/or to improve processor utilization. For example, an RDMA node (e.g., a physical or logical RDMA client device) in accordance with aspects described herein may be configured for posting, by an application executing in the user space (e.g., a location in memory where user applications run), an RDMA work request including a data element (e.g., a work queue entity loop count parameter) indicating one or more RDMA requests associated with the RDMA work request to be generated by software executing in kernel space (e.g., a location in memory where the kernel or related processes run); and generating and sending, by the software executing in the kernel space, the plurality of RDMA requests to or via a system under test (SUT), e.g., one or more intermediate switches or other devices.

Since an RDMA related test solution may repeatedly post the same RoCE v2 operation or command, the overhead involved in reposting the same command from an application can be significant. Also, if an RDMA test solution is implemented in software, such overhead and other inefficiencies can make matching performance metrics of hardware based or network interface card (NIC) test solutions a challenge. Advantageously, by extending an RDMA framework (e.g., an IB verbs implementation) or a related API for triggering the generation of multiple RDMA requests in kernel space from a single work request posted in user space, overhead and processor utilization issues can be reduced, thereby bringing a software based RDMA related test solution closer to NIC-based test solutions, e.g., by substantially matching their performance numbers in most cases. In some embodiments, various RDMA frameworks as described herein reduces overhead and/or other inefficiencies to significantly improve performance. In such embodiments, test platforms utilizing such frameworks can effective test of SUTs (e.g., switches) in real life scenarios, without requiring hardware based or network interface card (NIC) test solutions.

Reference will now be made in detail to various embodiments of the subject matter described herein, examples of which are illustrated in the accompanying drawings. Wherever possible, the same reference numbers will be used throughout the drawings to refer to the same or like parts.

FIG. 1 is a diagram illustrating an example environment 100 for RDMA related testing. Referring to FIG. 1, environment 100 may include an RDMA client 102, a SUT 104, and an RDMA server 106. Each of RDMA client 102 and RDMA server 106 may be any suitable entity or entities (e.g., software executing on a processor, an application-specific integrated circuit (ASIC), a field programmable gate array (FPGA), or a combination of software, an ASIC, or an FPGA) for communicating using RoCE and/or sending or receiving RDMA packets. For example, RDMA client 102 and RDMA server 106 may each include a physical RNIC capable of initiating or accepting an RDMA transaction. In this example, RDMA client 102 and RDMA server 106 may be capable of allowing an application direct access to the RNIC, e.g., without involvement from an operating system and/or without the need to copy data to a memory buffer, thereby reducing required overhead.

In some embodiments, each of RDMA client 102 and RDMA server 106 may utilize an RNIC that implements a host channel adapter (HCA) for creating a channel from its RDMA engine to the application memory via a peripheral component interconnect (PCI) express bus. The HCA or the RDMA engine may implement in hardware all the logic needed to execute an RDMA protocol over the wire, including segmentation and reassembly as well as flow control and reliability. RDMA client 102 and RDMA server 106 may setup data channels using a kernel driver, also referred to a command channel. After established the data channels, RDMA client 102 and RDMA server 106 or RNICs therein may read and write buffers directly, e.g., without the kernel driver.

SUT 104 may be any suitable entity or entities (e.g., devices, systems, or platforms) for communicating with RDMA client 102 and/or receiving, processing, forwarding, and/or sending test traffic, non-test traffic, or other data. For example, SUT 104 may include a network router, a network switch, a network device, a server, or a network controller. In another example, SUT 104 may include one or more systems and/or computing platforms, e.g., a data center or a group of servers and/or switches connected via a network. In yet another example, SUT 104 may include one or more networks or related components, e.g., a converged Ethernet network, an access network, a core network, or the Internet.

In some embodiments, RDMA client 102 may include or be associated with an RoCE v2 traffic generation and simulation tool. For example, RDMA client 102 or a related entity may be configured for stress-testing RDMA capable switches or other devices by generating RDMA traffic using an IB verbs implementation or an RDMA framework.

In some embodiments, RDMA client 102 may include traffic generation and/or related testing functionality. For example, RDMA client 102 or a related entity may generate and send test RDMA traffic to or via SUT 104. In this example, RDMA client 102 may receive related RDMA traffic from or via SUT 104 and analyze one or more performance aspects associated with SUT 104.

In some embodiments, RDMA client 102 may be a stand-alone tool, an in-line device, a testing device, a testing platform, a network tap, or software executing on at least one processor. In some embodiments, RDMA client 102 may be a single node or may be distributed across multiple computing platforms or nodes.

In some embodiments, RDMA client 102 may include one or more modules for performing various functions or operations. For example, RDMA client 102 may include a network node emulation module for emulating an RDMA capable node or device that communicates with or via SUT 104.

RDMA client 102 may include an RDMA user application (RUA) 108, a work queue 110, a completion queue 112, an RDMA kernel module (RKM) 114, and one or more communication interface(s) 116. RUA 108 may be any suitable entity or entities (e.g., software executing on one or more processors in RDMA client 102) for performing one or more aspects associated with RDMA testing and/or RDMA traffic generation. For example, RUA 108 may be a user application executing in user space (e.g., of RDMA client 102). In this example, RUA 108 may be configured for generating and posting RDMA work requests indicating RDMA requests or commands to generate and send, e.g., by RKM 114. In some embodiments, RUA 108 may post work requests, e.g., by adding them to work queue 110) using an RDMA framework (e.g., an IB verbs implementation) or a related API.

Work queue 110 may represent a particular memory portion or region for storing data associated with RDMA traffic. Example types of work queue 110 may include a send queue or a receive queue. For example, work queue 110 may be one or more memory region in random-access memory (RAM) and may store work requests (e.g., work queue entries (WQEs)) posted by RUA 108 for RKM 114. In this example, work queue 110 or work requests thereof can be read, obtained, or accessed by RKM 114. In another example, work queue 110 may be one or more memory region in RAM and may store data received or requested by RKM 114 for RUA 108. In this example, work queue 110 or received data thereof can be read, obtained, or accessed by RUA 108.

In some embodiments, a send queue and a receive queue for a requester (e.g., RUA 108) and an initiator (e.g., RKM 114) may be referred to as a queue pair (QP). In some embodiments, an RDMA configuration may be defined in part by the number of QPs allowed and/or by the number of particular send or receive queues per QP.

Completion queue 112 may represent a particular memory portion or region for storing completion notification associated with work requests. For example, completion queue 112 may be one or more memory regions in RAM and may store notification or related information posted by RKM 114 for RUA 108. In this example, completion queue 112 or notifications thereof can be read, obtained, or accessed by RUA 108.

In some embodiments, RUA 108 or a related entity (e.g., a test generator) may generate test sessions, test cases, or related test traffic for simulating RDMA transactions or other realistic scenarios. For example, RUA 108 may receive user input via a user interface (e.g., an API and a graphical user interface (GUI)) to obtain user intent or other information about a test scenario, e.g., a scenario to analyze or test network congestion control. In this example, RUA 108 may use the user input and predefined test case templates, analysis templates, or related data to generate one or more test cases and/or test sessions involving generating RDMA traffic using RKM 114.

RKM 114 may be any suitable entity or entities (e.g., software executing on one or more processors, an ASIC, an FPGA, or a combination of software, an ASIC, or an FPGA) for performing one or more aspects associated with generating RDMA traffic. For example, RKM 114 may be operating system or kernel code or software executing in kernel space (e.g., of RDMA client 102). In this example, RKM 114 may be configured for obtaining RDMA work requests (e.g., from work queue 110) and may use the work request to generate and send corresponding RDMA requests or commands. Continuing with this example, RKM 114 may also receive responses and related data (e.g., from RDMA server 106) via SUT 104 and communication interface(s) 116 and may also post completion notifications to completion queue 112.

Communication interface(s) 116 may include or utilize any suitable entity or entities (e.g., one or more network interface cards (NICs), physical processors, and/or other hardware) for sending or receiving communications. For example, RDMA client 102 or entities thereof may use one or more multiple communications interface(s) 116 for receiving and sending test packets, configuration instructions, observed traffic or related metrics, or other data.

In some embodiments, communications interface(s) 116 may send or receive IP messages, Ethernet frames, Ethernet messages, packet data units (PDUs), datagrams, user datagram protocol (UDP) messages, TCP messages, IP version 4 (v4) messages, IP version 6 (v6) messages, stream control transmission protocol (SCTP) messages, real-time transport protocol (RTP) messages, or reliable data protocol (RDP) messages, RoCE v2 messages, messages using a tunneling protocol, and/or other data units.

In some embodiments, communications interface(s) 116 may include multiple port modules for interacting with SUT 104. In some examples, a port module may include one or more transmit ports for sending test packets to SUT 104 or a node thereof and one or more receive ports for receiving test packets back from SUT 104 or a node thereof. In some examples, each port module or port(s) thereof may be assigned to a particular application, service, test flow, and/or IP address and port or for handling communications associated with a particular function or role.

RDMA client 102 and/or entities therein (e.g., RUA 108 and RKM 114) may include functionality for accessing data storage, e.g., a storage device, a non-transitory computer readable medium, or a storage system) for maintaining or storing information related to testing. For example, data storage may contain simulated test traffic, test cases, test session data, topology information for SUT 104, configuration settings, and/or various algorithms or logic for generating and sending RDMA related traffic. In some embodiments, an accessible data storage may be located at RDMA client 102, another node, or distributed across multiple platforms or devices.

It will be appreciated that FIG. 1 is for illustrative purposes and that various nodes and/or modules, locations, and/or functionality described above in relation to FIG. 1 may be changed, altered, added, or removed.

Figure 2:
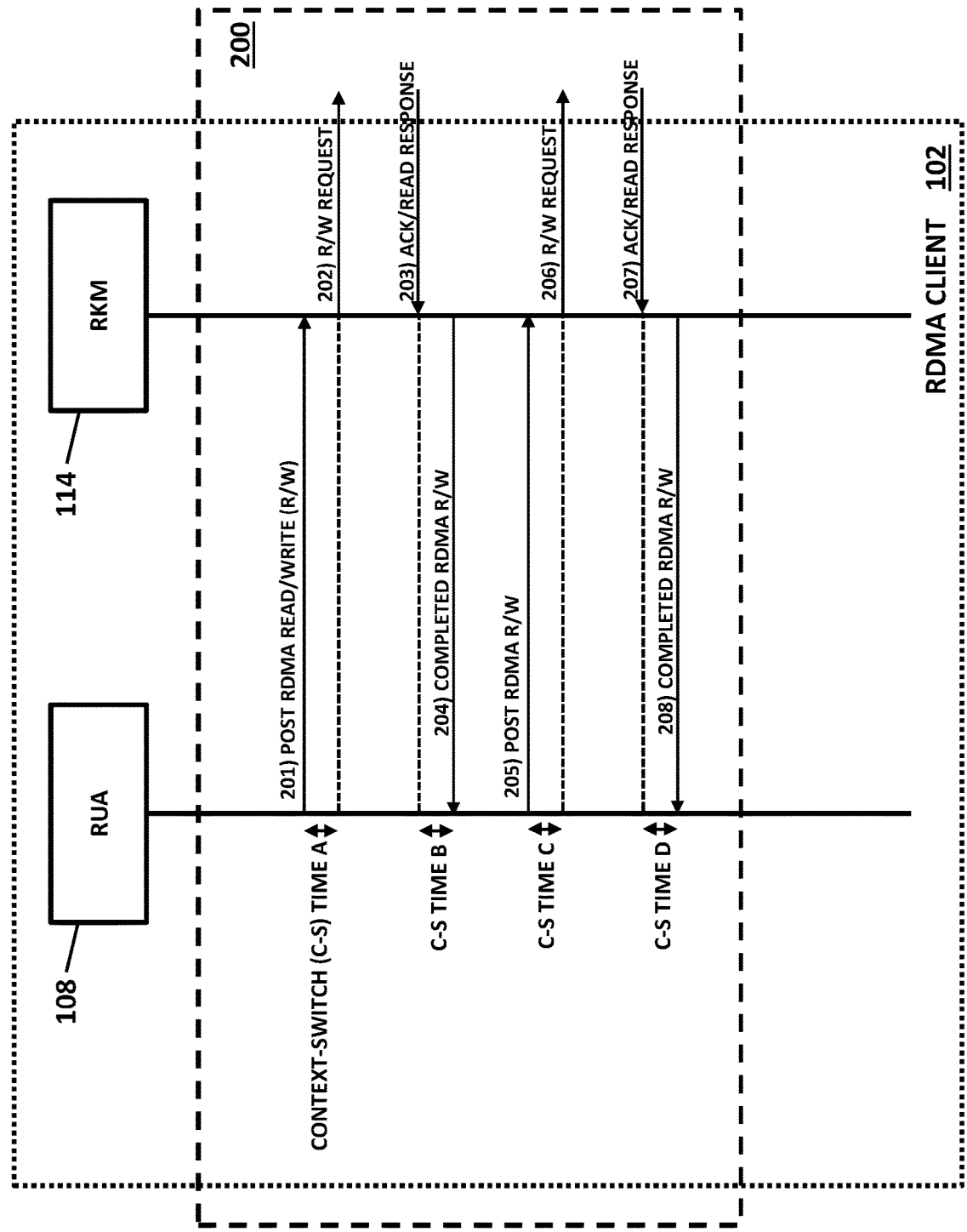
FIG. 2 is a message flow diagram illustrating an example process associated with generating and sending RDMA traffic at an RDMA client.

FIG. 2 is a message flow diagram illustrating an example process 200 associated with generating and sending RDMA traffic at RDMA client 102. In some embodiments, process 200 may involve RDMA client 102 implementing a "sequential" RDMA framework (e.g., an IB verbs implementation or a related API, for generating RDMA requests or other messages. In such embodiments, the "sequential" RDMA framework may involve IB verbs where every command is executed sequentially for each QP, e.g., a command (e.g., work requests) is posted (e.g., added to a work queue for a QP) only after a completion event for a proceeding command (e.g., the most recent command posted for that QP) is received.

In some embodiments, when testing RDMA related nodes (e.g., SUT 104), RDMA client 102 or other entity may post and/or send the same command repeatedly. Regardless of whether the command is a duplicate, each command post and send event can require a context-switch between user space and kernel space which can be result in processor inefficiencies (e.g., unused processor cycles). Hence, context-switching between the user space and kernel space as depicted in FIG. 2 can drastically reduce the throughput performance of a test platform. This throughput performance issue is further magnified when the commands are associated with small RDMA payloads since the frequency or number of context-switches is inversely related to RDMA payload size (e.g., amount of data to be read or written).

Referring to FIG. 2, RUA 108 may represent an application that runs in user space of RDMA client 102 and RKM 114 may represent a module or software executing in kernel space, e.g., a higher-privileged memory space than user space, of RDMA client 102.

In step 201, a work request (e.g., an RDMA read or write command) may be generated by RUA 108 and posted (e.g., added to a send queue or work queue 110).

Prior to step 202, a context-switch from user space to kernel space may occur in some amount of time (represented as context-switch time A in FIG. 2).

In step 202, based on the posted work request, an RDMA request (e.g., an RDMA write or read operation message) may be generated and sent (e.g., to or via SUT 104) by RKM 114.

In step 203, a response associated with the RDMA request may be received (e.g., from or via SUT 104) by RKM 114.

Prior to step 204, a context-switch from kernel space to user space may occur in some amount of time (represented as context-switch time B in FIG. 2).

In step 204, a completion notification (e.g., a completed RDMA read or write notification) may be generated by RKM 114 and posted (e.g., added to completion queue 112).

In step 205, another work request (e.g., an RDMA read or write command) may be generated by RUA 108 and posted (e.g., added to a send queue or work queue 110).

Prior to step 206, a context-switch from user space to kernel space may occur in some amount of time (represented as context-switch time C in FIG. 2).

In step 206, based on the posted work request, an RDMA request (e.g., an RDMA write or read operation message) may be generated and sent (e.g., to or via SUT 104) by RKM 114.

In step 207, a response associated with the RDMA request may be received (e.g., from or via SUT 104) by RKM 114.

Prior to step 208, a context-switch from kernel space to user space may occur in some amount of time (represented as context-switch time D in FIG. 2).

In step 208, a completion notification (e.g., a completed RDMA read or write notification) may be generated by RKM 114 and posted (e.g., added to completion queue 112).

It will be appreciated that FIG. 2 is for illustrative purposes and that different and/or additional steps other than those depicted in FIG. 2 may occur. Further, it will be appreciated that some steps may occur in a different order than depicted in FIG. 2 and that functionality described above in relation to FIG. 2 may be changed, altered, added, or removed.

Figure 3:
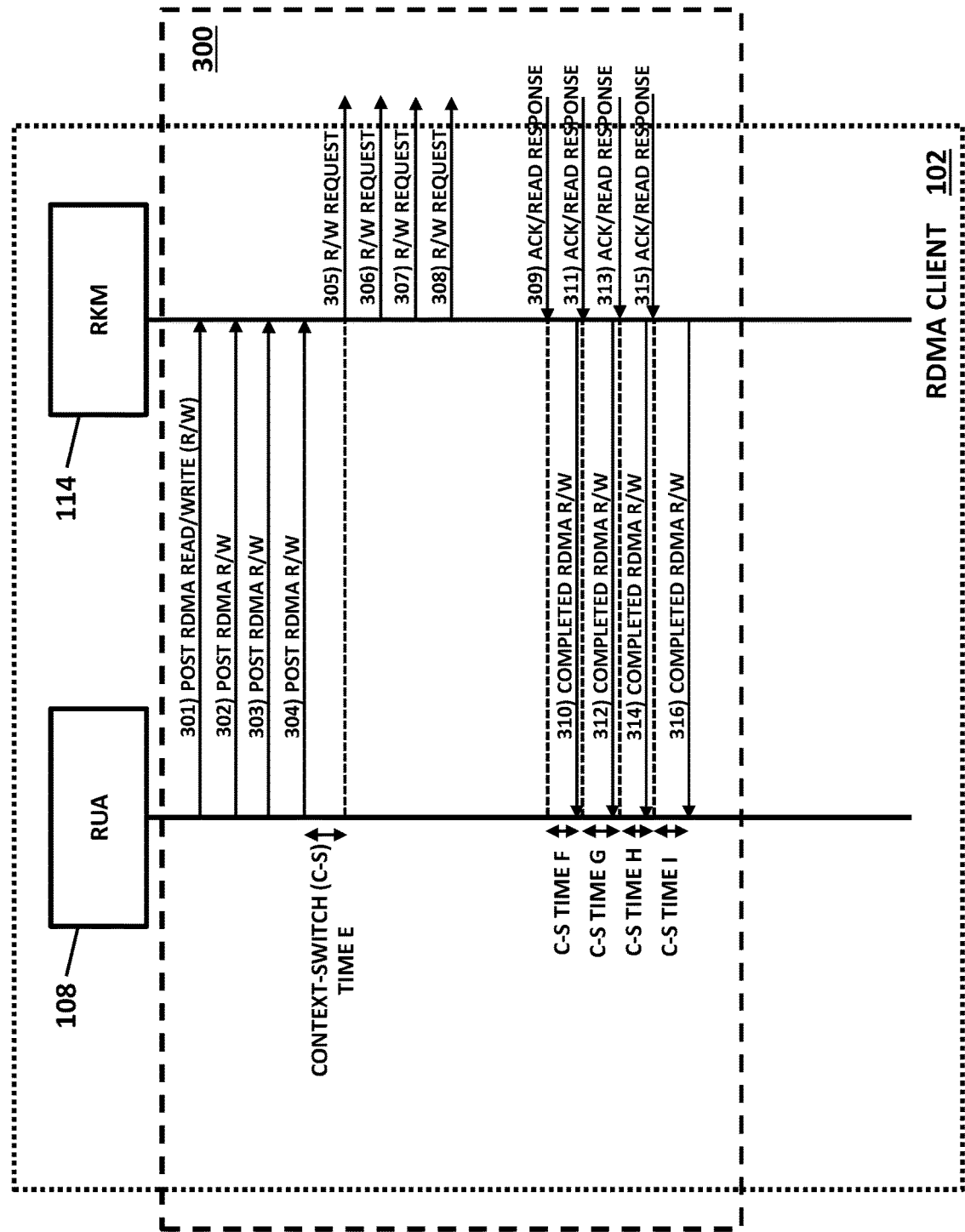
FIG. 3 is a message flow diagram illustrating another example process associated with generating and sending RDMA traffic at an RDMA client.

FIG. 3 is a message flow diagram illustrating another example process 300 associated with generating and sending RDMA traffic at RDMA client 102. In some embodiments, process 300 may involve RDMA client 102 implementing a "multiple send queue" RDMA framework (e.g., an IB verbs implementation or a related API) for generating RDMA requests or other messages. In such embodiments, the "multiple send queue" RDMA framework may involve using multiple send queues for each QP (instead of one send queue for each QP) for each QP to send multiple send requests concurrently. Such a framework can help reduce the number of context-switches (compared to the "sequential" RDMA framework depicted in FIG. 2) to some extent but may have some limitations.

One possible limitation of the "multiple send queue" RDMA framework depicted in FIG. 3 is that although multiple send requests can be sent concurrently (and without multiple context-switches), the notification events for completion of a work request is received one after the other. Hence, the number of context-switches for a certain number of work requests to be completed in the approach depicted in FIG. 3 can be reduced by about 50% from the number of context-switches for the same number of work requests to be completed in the approach depicted in FIG. 2.

Another possible limitation of the "multiple send queue" RDMA framework depicted in FIG. 3 is that the maximum amount of send queues is limited based on various factors, including available memory and message payload size. For example, in order to post multiple requests concurrently (e.g., at or near the same time), multiple memory regions need to be created for an initiator and a requester associated with the QP. Further, since the amount of memory required on the port is directly proportional to message payload size, large RDMA payloads can limit the maximum number of memory regions (e.g., send queues) substantially.

Referring to FIG. 3, RUA 108 may represent an application that runs in user space of RDMA client 102 and RKM 114 may represent a module or software executing in kernel space, e.g., a higher-privileged memory space than user space, of RDMA client 102.

In step 301, a first work request (e.g., an RDMA read or write command) may be generated by RUA 108 and posted (e.g., added to a first send queue In step 302, a second work request (e.g., an RDMA read or write command) may be generated by RUA 108 and posted (e.g., added to a second send queue In step 303, a third work request (e.g., an RDMA read or write command) may be generated by RUA 108 and posted (e.g., added to a third send queue).

In step 304, a fourth work request (e.g., an RDMA read or write command) may be generated by RUA 108 and posted (e.g., added to a fourth send queue).

Prior to step 305, a context-switch from user space to kernel space may occur in some amount of time (represented as context-switch time E in FIG. 3).

In step 305, based on the first work request from the first send queue, an RDMA request (e.g., an RDMA write or read operation message) may be generated and sent (e.g., to or via SUT 104) by RKM 114.

In step 306, based on the second work request from the second send queue, an RDMA request (e.g., an RDMA write or read operation message) may be generated and sent (e.g., to or via SUT 104) by RKM 114.

In step 307, based on the third work request from the third send queue, an RDMA request (e.g., an RDMA write or read operation message) may be generated and sent (e.g., to or via SUT 104) by RKM 114.

In step 308, based on the fourth work request from the fourth send queue, an RDMA request (e.g., an RDMA write or read operation message) may be generated and sent (e.g., to or via SUT 104) by RKM 114.

In step 309, a response associated with the first RDMA request may be received (e.g., from or via SUT 104) by RKM 114.

Prior to step 310, a context-switch from kernel space to user space may occur in some amount of time (represented as context-switch time F in FIG. 3).

In step 310, a completion notification (e.g., a completed RDMA read or write notification) may be generated by RKM 114 and posted (e.g., added to completion queue 112).

In step 311, a response associated with the second RDMA request may be received (e.g., from or via SUT 104) by RKM 114.

Prior to step 312, a context-switch from kernel space to user space may occur in some amount of time (represented as context-switch time G in FIG. 3).

In step 312, a completion notification (e.g., a completed RDMA read or write notification) may be generated by RKM 114 and posted (e.g., added to completion queue 112).

In step 313, a response associated with the third RDMA request may be received (e.g., from or via SUT 104) by RKM 114.

Prior to step 314, a context-switch from kernel space to user space may occur in some amount of time (represented as context-switch time H in FIG. 3).

In step 314, a completion notification (e.g., a completed RDMA read or write notification) may be generated by RKM 114 and posted (e.g., added to completion queue 112).

In step 315, a response associated with the fourth RDMA request may be received (e.g., from or via SUT 104) by RKM 114.

Prior to step 316, a context-switch from kernel space to user space may occur in some amount of time (represented as context-switch time I in FIG. 3).

In step 316, a completion notification (e.g., a completed RDMA read or write notification) may be generated by RKM 114 and posted (e.g., added to completion queue 112).

It will be appreciated that FIG. 3 is for illustrative purposes and that different and/or additional steps other than those depicted in FIG. 3 may occur. Further, it will be appreciated that some steps may occur in a different order than depicted in FIG. 3 and that functionality described above in relation to FIG. 3 may be changed, altered, added, or removed.

Figure 4:
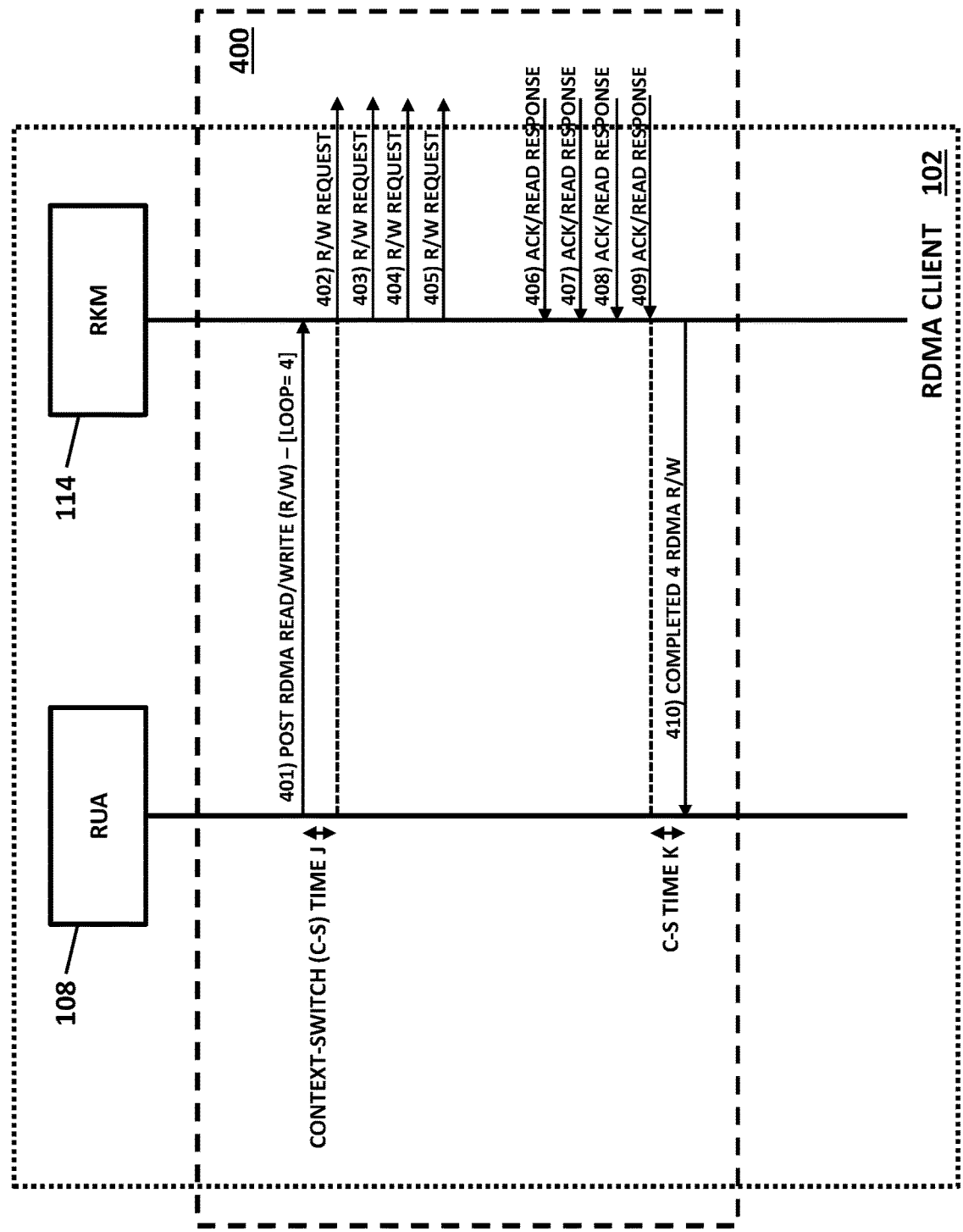
FIG. 4 is a message flow diagram illustrating another example process associated with generating and sending RDMA traffic at an RDMA client.

FIG. 4 is a message flow diagram illustrating another example process 400 associated with generating and sending RDMA traffic at RDMA client 102. In some embodiments, process 400 may involve RDMA client 102 implementing an "extended" RDMA framework (e.g., an IB verbs implementation or a related API) for generating RDMA requests or other messages. In such embodiments, the "extended" RDMA framework may involve allowing an application (e.g., RUA 108) to generate and post a work request (e.g., a work queue entry (QWE)) comprising a data element (e.g., a WQE loop count parameter) indicating one or more RDMA requests are to be generated in kernel space. In such embodiments, after the work request is completed (e.g., after responses are received for all the RDMA requests associated with the work request), the "extended" RDMA framework may also involve a single completion notification being sent (e.g., via completion queue 112) to the application.

In some embodiments, an "extended" RDMA framework may extend work requests (e.g., WQEs) to include or utilize a new data element or parameter (e.g., a WQE loop count parameter) for indicating a number of identical RDMA requests to be generated and sent in kernel space (e.g., by RKM 114). Once an "extended" work request is posted, RKM 114 or another entity may use the work request to generate and send an RDMA read or write request to a responder (e.g., RDMA server 106), e.g., via SUT 104. After the first RDMA request is completed, a replica or copy of the RDMA request may be made and sent (e.g., by RKM 114) and this may continue until the total number of RDMA requests sent equals the amount indicated by an associated loop parameter.

In some embodiments, using a loop related data element or parameter with a work request to generate multiple copies of an RDMA request in kernel space significantly reduces the number of context-switches made during a performance test. For example, since a test solution may repeatedly post a same work request over and over again, context-switching (which can waste processor cycles) is an overhead cost that can be reduced when performing RDMA related testing using an "extended" RDMA framework as depicted in FIG. 4.

Referring to FIG. 4, RUA 108 may represent an application that runs in user space of RDMA client 102 and RKM 114 may represent a module or software executing in kernel space, e.g., a higher-privileged memory space than user space, of RDMA client 102.

In step 401, a work request (e.g., an RDMA read or write command) comprising a loop parameter value of '4' may be generated by RUA 108 and posted (e.g., added to a send queue or work queue 110).

Prior to step 402, a context-switch from user space to kernel space may occur in some amount of time (represented as context-switch time J in FIG. 4).

In steps 402-405, based on the posted work request, multiple RDMA requests (e.g., RDMA write or read operation messages) may be generated and sent (e.g., to or via SUT 104) by RKM 114.

In steps 406-409, responses associated with the RDMA requests may be received (e.g., from or via SUT 104) by RKM 114.

Prior to step 410, a context-switch from kernel space to user space may occur in some amount of time (represented as context-switch time K in FIG. 4).

In step 410, after receiving all the responses associated with the work request, a completion notification (e.g., a completed RDMA read or write notification) may be generated by RKM 114 and posted (e.g., added to completion queue 112).

It will be appreciated that FIG. 4 is for illustrative purposes and that different and/or additional steps other than those depicted in FIG. 4 may occur. Further, it will be appreciated that some steps may occur in a different order than depicted in FIG. 4 and that functionality described above in relation to FIG. 4 may be changed, altered, added, or removed.

FIG. 5 illustrates example data 500 indicating RDMA performance improvements associated with utilizing WQE loop count parameters. Data 500 indicates throughput performance for various configurations of RDMA architecture utilizing two techniques. Referring to data 500, Technique 1 is similar to the approach (e.g., a "multiple send queue" RDMA framework) described above with regard to FIG. 4. For example, Technique 1 may involve a RUA 108 using eight send queues per QP, where eight work requests (e.g., one from each of the eight send queue) are concurrent sent and used to generate and send 8 RDMA requests by RKM 114 after a context-switch (e.g., from user space to kernel space).

Technique 2 is similar to the technique (e.g., an "extended" RDMA framework) described above with regard to FIG. 5. For example, Technique 2 may involve a RUA 108 posting a work request with a data element indicating a number of corresponding RDMA requests to generate and send by RKM 114 (without context-switching being required when generating and sending each of the RDMA requests).

Data 500 indicates that a first configuration of an RDMA client 102 involving RDMA message payload sizes of 64 bytes (B) and 192 QPs may have an average throughput of 1 Gigabits per seconds (Gbps) when Technique 1 is utilized and an average throughput of 1.6 Gbps when Technique 2 is utilized for a 60% improvement.

Data 500 indicates that a second configuration of an RDMA client 102 involving RDMA message payload sizes of 128 B and 192 QPs may have an average throughput of 1.58 Gbps when Technique 1 is utilized and an average throughput of 2.4 Gbps when Technique 2 is utilized for a 51.9% improvement.

Data 500 indicates that a third configuration of an RDMA client 102 involving RDMA message payload sizes of 256 B and 192 QPs may have an average throughput of 2.58 Gbps when Technique 1 is utilized and an average throughput of 3.2 Gbps when Technique 2 is utilized for a 24% improvement.

Data 500 indicates that a fourth configuration of an RDMA client 102 involving RDMA message payload sizes of 512 B and 192 QPs may have an average throughput of 4.5 Gbps when Technique 1 is utilized and an average throughput of 5.7 Gbps when Technique 2 is utilized for a 26.7% improvement.

Data 500 indicates that a fifth configuration of an RDMA client 102 involving RDMA message payload sizes of 1024 B and 192 QPs may have an average throughput of 7.5 Gbps when Technique 1 is utilized and an average throughput of 10 Gbps when Technique 2 is utilized for a 33.3% improvement.

Data 500 indicates that a sixth configuration of an RDMA client 102 involving RDMA message payload sizes of 2048 B and 192 QPs may have an average throughput of 11 Gbps when Technique 1 is utilized and an average throughput of 15 Gbps when Technique 2 is utilized for a 36.4% improvement.

Data 500 indicates that a seventh configuration of an RDMA client 102 involving RDMA message payload sizes of 4096 B and 192 QPs may have an average throughput of 21 Gbps when Technique 1 is utilized and an average throughput of 24.5 Gbps when Technique 2 is utilized for a 16.7% improvement.

As indicated by data 500, as the message payload size changes (e.g., for a test session), throughput increases for both techniques. In some embodiments, the WQE loop count value in Technique 2 may be dependent on payload size. For example, to achieve a maximum possible throughput (e.g., 25 Gbps) with a minimum or optimal WQE loop count value, RUA 108 or another entity may utilize an algorithm that takes into account payload size and/or configuration details to determine a minimum or optimal WQE loop count value.

Figure 6:
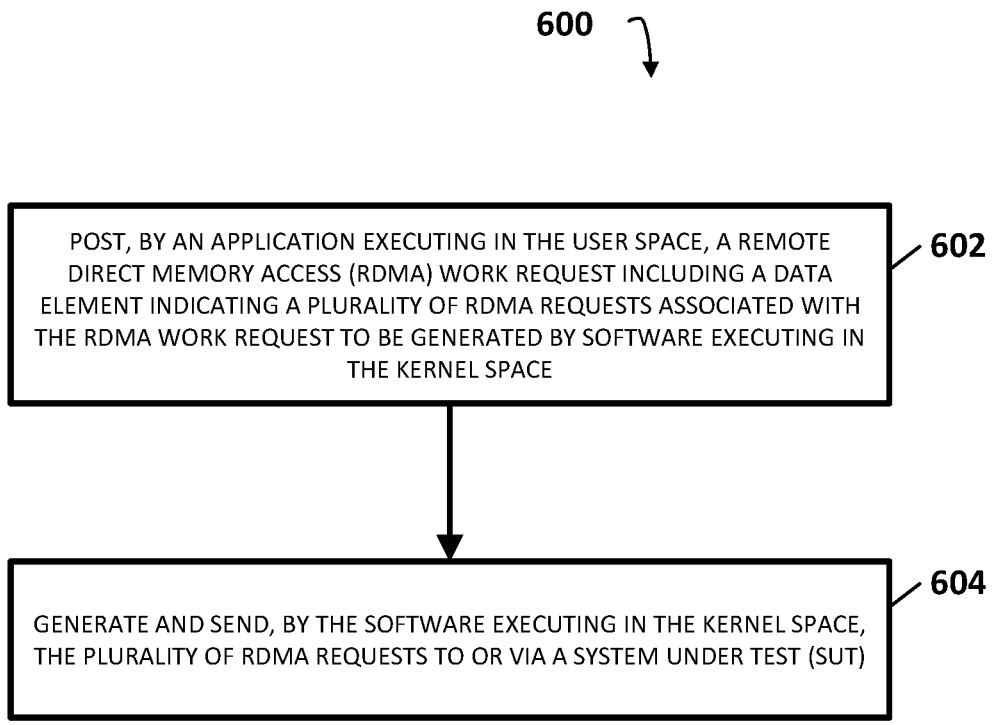
FIG. 6 is a flow chart illustrating an example process for improving RDMA performance.

FIG. 6 is a flow chart illustrating an example process 600 for improving RDMA performance. In some embodiments, process 600, or portions thereof, may be performed by or at RDMA client 102, RDMA server 106, RUA 108, RKM 114, and/or another node or module. In some embodiments, process 600 may include steps 602 and/or 604.

Referring to process 600, in step 602, an RDMA work request may be posted by an application running in user space, where the RDMA work request includes a data element indicating a plurality of RDMA requests associated with the RDMA work request to be generated by software executing in the kernel space. For example, RUA 108 may generate a work request for a read operation associated with a SAN or device thereof. In this example, the work request may include a WQE loop count parameter indicating a value representing a number of corresponding RDMA requests (e.g., write operation requests) that RKM 114 will generate and send. Continuing with this example, RUA 108 may post the work request by adding the work request (e.g., as a WQE) to work queue 110.

In step 604, the plurality of RDMA requests (e.g., a plurality of read operation requests or write operation requests) may be generated and sent to or via a SUT by software executing in the kernel space. For example, RKM 114 may obtain a WQE from work queue 110 and may read a data element (e.g., a WQE loop count parameter value, like 4) associated with the WQE. In this example, RKM 114 may generate and send a number of RDMA requests based on the data element.

In some embodiments, a plurality of RDMA requests (e.g., sent by RKM 114 in response to a WQE including or indicating a WQE loop count parameter value) may be identical. For example, a plurality of RDMA requests may include replicas or copies of a read operation request or a write operation request.

In some embodiments, a plurality of RDMA requests may be generated and sent without multiple context-switches between the kernel space and the user space.

In some embodiments, a data element (e.g., located in or associated with a work request or WQE) may include a work queue entry loop count parameter comprising a positive integer.

In some embodiments, after determining that a plurality of RDMA requests are completed, a notification indicating that the RDMA work request is completed may be sent by software executing in the kernel space. For example, RKM 114 may post a notification to completion queue 112 for reading by RUA 108.

In some embodiments, determining that a plurality of RDMA requests are completed may include receiving a corresponding response for each of a plurality of sent RDMA requests. For example, after sending five write operation requests, RKM 114 may wait to receive five acknowledgements regarding those requests, before sending a notification that a work request for five write operations is completed.

In some embodiments, an RDMA work request may be posted using an IB verbs related API or another programming or communications framework.

In some embodiments, a SUT (e.g., a SUT that receives or processes RDMA requests and/or related response, like SUT 104) may include a network switch, a network device, a fabric device, a fabric, a local area network, a wide area network, a data center related network, a converged Ethernet network, a data server, a web server, an RoCE related node, or a data center related node.

In some embodiments, an RDMA node (e.g., a RDMA capable test platform or other RDMA capable device, like RDMA client 102) may include a network equipment test system, a host adapter, an HCA, a NIC, an RDMA capable NIC, a traffic generator, an FPGA, an ASIC, or a processor.

It will be appreciated that process 600 is for illustrative purposes and that different and/or additional actions may be used. It will also be appreciated that various actions described herein may occur in a different order or sequence.

It should be noted that RDMA client 102, RDMA server 106, RUA 108, RKM 114, and/or functionality described herein may constitute a special purpose computing device. Further, RDMA client 102, RDMA server 106, RUA 108, RKM 114, and/or functionality described herein can improve the technological field of network congestion control configuration and/or related testing by providing various techniques for analyzing and/or testing congestion control in SUT 104, e.g., a data center environment. For example, RDMA client 102, RDMA server 106, RUA 108, RKM 114, and/or functionality described herein can be used to improve RDMA performance by reducing context-switches between user space and kernel space when sending or generating RDMA traffic (e.g., when testing SUT 104). In this example, RDMA client 102, RDMA server 106, RUA 108, RKM 114, and/or functionality described herein can utilize an IB verb function or a related message that indicates a data element (e.g., a WE loop count) for indicating a number of corresponding RDMA requests to generate by software executing in kernel space.

While various examples discussed above relate to data center environments or test environments that employ an RoCE architecture, it will be appreciated that various embodiments of the subject matter described herein may provide similar benefits or improvements for other environments including, for example, other RDMA like architectures and associated protocols, e.g., IB RNIC, iWARP RNIC, Fibre Channel RNIC, etc.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for improving remote direct memory access (RDMA) performance, the method comprising:
at a remote direct memory access (RDMA) client utilizing a user space and a kernel space for executing software:
posting, by an application executing in the user space, a single RDMA work request including a data element indicating a plurality of RDMA requests associated with the single RDMA work request to be generated by software executing in the kernel space, wherein the data element includes a work queue entry loop count parameter comprising a positive integer indicating the number of RDMA requests in the plurality of RDMA requests;
in response to the single RDMA work request and, using the work queue entry loop count parameter of the single RDMA work request, generating and sending, by the software executing in the kernel space, the plurality of RDMA requests to an RDMA server via a system under test (SUT), wherein the plurality of RDMA requests are identical, the SUT comprises at least one network switch located between the RDMA client and the RDMA server, and sending the RDMA requests to the RDMA server via the SUT includes stress testing the at least one network switch by flooding the at least one network switch with data packets carrying the RDMA requests; and
after determining, by the software executing in kernel space, that operations requested by the plurality of RDMA requests have been completed, posting, by the software executing in kernel space, a notification indicating that processing of the single RDMA work request is completed.

2. The method of claim 1 wherein determining that operations requested by the plurality of RDMA requests have been completed includes receiving a corresponding response for each of the plurality of RDMA requests.

3. The method of claim 1 wherein each of the plurality of RDMA requests is generated and sent without multiple context-switches between the kernel space and the user space.

4. The method of claim 1 wherein the RDMA work request is posted using an InfiniBand (IB) verbs related application programming interface (API).

5. The method of claim 1 wherein the plurality of RDMA requests includes a read operation request or a write operation request.

6. A system for improving remote direct memory access (RDMA) performance, the system comprising:
at least one processor; and
a remote direct memory access (RDMA) client implemented using the at least one processor, the RDMA node utilizing a user space and a kernel space for executing software, wherein the RDMA node is configured for:
posting, by an application executing in the user space, a single RDMA work request including a data element indicating a plurality of RDMA requests associated with the single RDMA work request to be generated by software executing in the kernel space, wherein the data element includes a work queue entry loop count parameter comprising a positive integer indicating the number of RDMA requests in the plurality of RDMA requests;
in response to the single RDMA work request and, using the work queue entry loop count parameter of the single RDMA work request, generating and sending, by the software executing in the kernel space, the plurality of RDMA requests to an RDMA server via a system under test (SUT), wherein the plurality of RDMA requests are identical, the SUT comprises at least one network switch located between the RDMA client and the RDMA server, and sending the RDMA requests to the RDMA server via the SUT includes stress testing the at least one network switch by flooding the at least one network switch with data packets carrying the RDMA requests; and
after determining, by the software executing in kernel space, that operations requested by the plurality of RDMA requests have been completed, posting, by the software executing in kernel space, a notification indicating that processing of the single RDMA work request is completed.

7. The system of claim 6 wherein determining that operations requested by the plurality of RDMA requests have been completed includes receiving a corresponding response for each of the plurality of RDMA requests.

8. The system of claim 6 wherein each of the plurality of RDMA requests is generated and sent without multiple context-switches between the kernel space and the user space.

9. The system of claim 6 wherein the RDMA work request is posted using an InfiniBand (IB) verbs related application programming interface (API).

10. The system of claim 6 wherein the plurality of RDMA requests includes a read operation request or a write operation request.

11. A non-transitory computer readable medium having stored thereon executable instructions that when executed by at least one processor of at least one computer cause the at least one computer to perform steps comprising:

at a remote direct memory access (RDMA) client utilizing a user space and a kernel space for executing software:
  posting, by an application executing in the user space, a single RDMA work request including a data element indicating a plurality of RDMA requests associated with the single RDMA work request to be generated by software executing in the kernel space, wherein the data element includes a work queue entry loop count parameter comprising a positive integer indicating the number of RDMA requests in the plurality of RDMA requests;
  in response to the single RDMA work request and, using the work queue entry loop count parameter of the single RDMA work request, generating and sending, by the software executing in the kernel space, the plurality of RDMA requests to an RDMA server via a system under test (SUT), wherein the plurality of RDMA requests are identical, the SUT comprises at least one network switch located between the RDMA client and the RDMA server, and sending the RDMA requests to the RDMA server via the SUT includes stress testing the at least one network switch by flooding the at least one network switch with data packets carrying the RDMA requests; and
  after determining, by the software executing in kernel space, that operations requested by the plurality of RDMA requests have been completed, posting, by the software executing in kernel space, a notification indicating that processing of the single RDMA work request is completed.

12. The non-transitory computer readable medium of claim 11 wherein each of the plurality of RDMA requests is generated and sent without multiple context-switches between the kernel space and the user space.

* * * * *